March 26, 1968
M. F. AUER
3,375,438
METHOD AND MEANS FOR ORIENTING CRYSTALS BY ALTERNATE
APPLICATION OF ANGULARLY SPACED MAGNETIC FIELDS
Filed Aug. 8, 1966
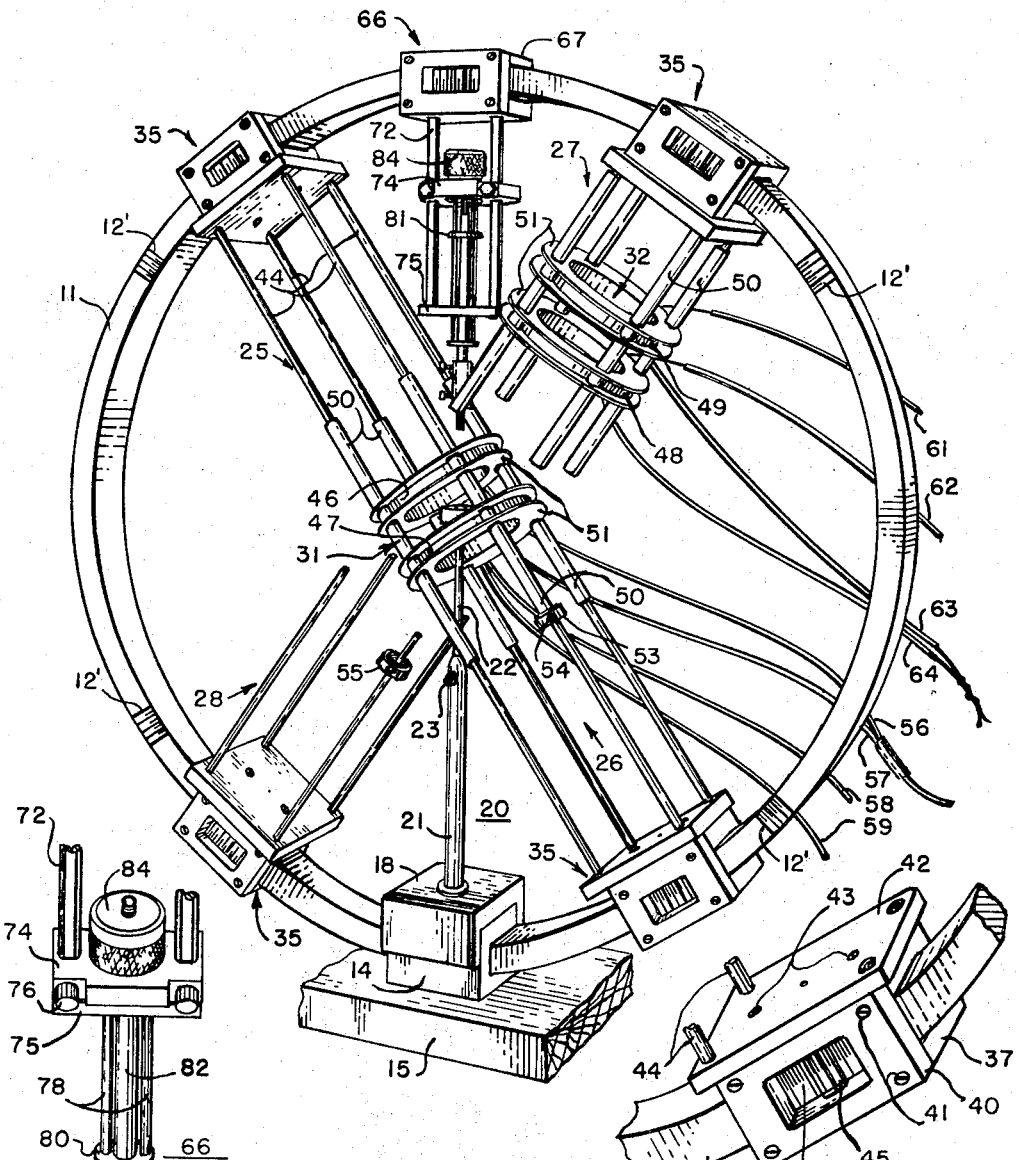
INVENTOR,
MARTIN F. AUER.
BY Harry M. Saragovitz,
Edward J. Kelly, Herbert Berl
& Julian C. Keppler
ATTORNEYS 3,375,438
METHOD AND MEANS FOR ORIENTING CRYSTALS BY ALTERNATE APPLICATION OF ANGULARLY SPACED MAGNETIC FIELDS
Martin F. Auer, Munich, Germany, assignor to the United States of America as represented by the Secretary of The Army
Filed Aug. 8, 1966, Ser. No. 571,146
8 Claims. (Cl. 324—14)

This invention relates to an improved method and means for orienting spherical ferromagnetic single crystals.

This invention concerns an improvement over a previous method and structure for orienting spherical monocrystalline ferromagnetic bodies described in U.S. Patent No. 3,183,434 of Martin F. Auer, entitled, "Universal Rotation Method and Apparatus for Locating Axes in Single Spherical Ferrimagnetic Crystals."

In the aforesaid patent, the spherical crystal is placed on a pool of mercury mounted between the poles of a powerful electromagnet. The magnet is energized and the crystal body being free to rotate in all directions, will move until one of its easy axes aligns itself with the direction of the magnetic field. Once this position is reached, a small dot of marking fluid is placed on the surface of the crystal at a point lying along the desired axis. The magnetic field then is removed and the crystal body is moved to a position estimated to be approximately that in which a second easy axis is in alignment with the magnetic field. Next, the magnetic field is restored and the crystal moved into a position locating the second easy axis. The second axis thus located is marked by hand or by a marking stylus mounted adjacent the sphere. Having located two of these easy axes, the sphere can be placed in a holder and viewed with an optical magnifying means. The sphere is manipulated in the holder until an intermediate axis displaced by a known amount from the easy axes is located. A mounting rod then is attached to the sphere with its axis coincident with the intermediate axis. In the aforesaid patent, an example of a cubic crystal of the yttrium iron garnet type is described wherein an intermediate axis bisects the angle between two easy axes 70.5 degrees apart and the hard axis bisects the angle between two easy axes 109.5 degrees apart. The accuracy of this procedure is determined by the precision with which the markings can be made, the accuracy with which the sphere can be picked up by the mounting rod, and by deviations of actual alignment owing to magnetic field deviations. This procedure presents certain problems, principally because the markings often cannot be made with precision; furthermore, it is somewhat difficult to orient the mounting rod relative to the axes of the sphere. Moreover, it is sometimes difficult, with this procedure, to maintain a uniform magnetic field in the region of the sphere.

In accordance with the invention, an improved method and means is provided for orienting the monocrystalline ferromagnetic body and for mounting a supporting member to said body in the proper position. With the method and structure according to the invention, the marking approach is eliminated and accurate field orientation and accurate positioning of the pick-up rod is attainable. Two uniform magnetic field producing assemblies are slidably mounted on an angle-calibrated ring so that their angular positions along the ring can be made to conform to the location of two axes characteristic of the material of which the body is made. The crystal body is held by means of a holding assembly at the center of the ring and is freely rotatable in any direction. A pick-up assembly is mounted along the ring and includes an adjustable elongated member having its longitudinal axis oriented along the desired axis of the crystal, that is, along a line bisecting the angle between the longitudinal axes of the two magnetic field producing assemblies. The pick-up assembly further includes a demountable supporting rod coaxial with, and attached to, said adjustable member. As each magnetic field assembly is separately energized, the spherical crystal body rotates in the associated magnetic field to one of two distinct positions. Alternate energization of the two magnetic field assemblies is repeated for a few times until the sample is properly oriented. After orientation of the sample, the pick-up assembly is positioned so that the demountable rod is brought into contact with the crystal body and is secured to each said body, as by Canada balsam or other suitable bonding material. The axis of the demountable supporting rod attached to the crystal body thus is in alignment with the desired axis of said crystal body.

Although the present invention provides for orienting ferromagnetic crystals along their crystallographic axes, the invention is particularly directed to orientation of ferromagnetic crystals of spherical shape along a related axis which can be located, for any given crystal material, once a particular pair of easy axes has been located. Above a certain strength of magnetic field, one of the easy axes of the ferromagnetic crystal will align itself with the flux lines of an applied magnetic field if the crystal is free to rotate in any direction. For a given material, it is known that two easy axes will be found angularly displaced from one another by a known amount. If two applied fields have their flux lines displaced by this known amount, one can establish two such easy axes, each lying in a common place, by subjecting the crystal alternately to the aforesaid applied magnetic fields. For a given material, the related axis may be located at a certain predetermined angle between the aforesaid easy axes and is commonly referred to as the intermediate axis; this intermediate axis is of considerable interest because rotation around it permits display of all three main axes of the crystal body.

The angular displacement of the magnetic fields may be increased so that the crystal body will align itself with another set of easy axes which are displaced, for any given material, by a known amount differing from that between the previously mentioned two easy axes. In this case, a hard axis will be located along the bisector of the angle between the aforesaid two easy axes.

Other objects of this invention will become apparent from the detailed description taken in conjunction with the accompanying drawing wherein:

FIG. 1 is a view showing an embodiment of the invention;

FIG. 2 is a detail view showing details of a slideable member of one of the support assemblies; and FIG. 3 is a detail view illustrating certain construction details of the pick-up assembly and crystal holding assembly.

In FIG. 1 of the drawing a circular mounting ring 11 is shown with portions having on one face thereof calibration markings 12. The ring 11 is shown, by way of example, of rectangular cross section and is mounted within a base block 14 adapted to lie on some flat surface 15 such as a work bench or table. An elongated crystal body holding assembly 20 is provided for freely mounting the crystal body 17 at the center of the mounting ring 11. This crystal holding assembly 20 includes a base portion 18 the position of which, relative to base block 14, can be adjusted slightly for initial alignment purposes. The crystal holding assembly 20 further includes a telescopic rod subassembly attached at one end to the base portion 18 and comprising an outer rod 21 and an inner rod 22. The inner rod 22, which is made of non-magnetic material, is adjustably positioned to the proper length by means of a set screw 23 so that the crystal body 17 at the end of rod 22 is at the geometrical center of the ring 11. The end of the inner rod 22 is somewhat enlarged and is provided with a cup-like indentation for receiving the spherical crystal body 17. See FIG. 3. In order to insure retention of the crystal body 17, a retaining cup 24 is attached near the free end of rod 22. The axis of the rod subassembly 21, 22 lies diametrically along the circular mounting ring 11.

A first pair of adjustable support assemblies 25 and 26 provides support for the first magnetic field producing assembly 31 and a second pair of adjustable support assemblies 27 and 28 similarly provides for the second magnetic field producing assembly 32. Each support assembly includes a composite slidable member 35 shown, by way of example, as constructed of a U-shaped element 37 and a face plate 40 attached to the U-shaped element 37 by screws 41 and a flat plate 42 attached to element 37 by screws 43 (see FIG. 2). Four rods 44, threaded at one end, are screwed into the flat plate 42. The face plate 40 of each support assembly contains a rectangular aperture in which a transparent index plate 45 carrying a cross-hair appears. The index plate 45 is carried by the slidable member 35 and, by noting the calibration mark 12 lying under the cross-hair, one can ascertain the angular position of the longitudinal axis of the corresponding support assembly relative to an axis coincident with the longitudinal axis of holding rod subassembly 21, 22 and passing through the center of the mounting ring 11. When the support assemblies 25 and 26 are adjusted properly, each of the rods 44 of support assembly 25 is in line with the corresponding rods 44 of support assembly 26. Similarly the rods 44 of support assembly 27 line up with the rods 44 of support assembly 28. For a yttrium iron garnet cubic crystal body, the angle between the common axis of support assemblies 25 and 26 and the common axis of support assemblies 27 and 28 is set to 70.5 degrees. The twelve o'clock position of the ring 11 is considered the zero position for assemblies 25 and 27 and the ring may be calibrated from zero in degrees for both clockwise and counterclockwise directions. Diametrically opposite calibration markings also are provided from the six o'clock zero position along ring 11 for assemblies 26 and 28. Alternatively, the ring may be calibrated from zero to 360 degrees and angles in either the counterclockwise or clockwise direction may be determined by subtracting the desired angle from 360 degrees. The member 35 may be maintained at the desired fixed position along ring 11 either by static friction between member 35 and ring 11 or by a set screw (not shown) inserted in the element 37 of member 35 and screwed against the back of ring 11.

The first magnetic field producing assembly 31 includes a first set of coils 46 and 47; likewise, the second magnetic field producing assembly 32 includes a second set of coils 48 and 49. The coils of each set are spaced apart a distance substantially equal to the radius of the coils. This coil arrangement, sometimes referred to as Helmholtz coils, provides a substantially uniform field in the region occupied by said coils. Each of the coils 46 to 49 are wound on spools 51 containing apertures through which corresponding hollow supporting sleeves 50 are inserted. The four sleeves 50 of a given field producing assembly fit tightly within the corresponding apertures to provide mechanical support for the coils. Initially, one of the magnetic field producing assemblies, for example, assembly 31, is slid along the rods 44 of supporting assemblies 25 and 26 to the operating position wherein the geometrical center of magnetic field producing assembly 31 coincides with the center of the crystal body 17. A collar 53 tightened by a set screw 54 on one of the rods 44 of the adjustable support assembly 26 serves to retain the field producing assembly 31 in the desired central position. A similar collar 55 is provided on one of the rods 44 of adjustable support assembly 28 for properly locating the field producing assembly 32 in its operating position. During the time that the field producing assembly 31 is in the operating position, that is, the position shown in FIG. 1, the other magnetic field producing assembly 32 is in the retracted position, as shown in FIG. 1, so that it is removed from the vicinity of crystal body 17. The Helmholtz coils 46 and 47 of magnetic field producing assembly 31 are energized by applying a source of current, not shown, to leads 56 to 59, whereby a uniform magnetic field is produced in the region of crystal body 17. The direction of the uniform magnetic field produced by the coils 46 and 47 of first magnetic producing assembly 31 is aligned with an axis passing through the center of coils 46 and 47; the angular position of this field, relative to the axis of the crystal holding assembly 20, can be read from the particular calibration mark 12 on circular ring 11 juxtaposed with the hairline on index plate 45 of support assembly 25 and the index plate 45 of support assembly 26. In the case of cubic crystals of YIG type, where an intermediate axis is to be located relative to two easy axes, the direction of the uniform magnetic field is 35.25 degrees displaced from the axis of rod 22 since the directions of the two magnetic fields with which the aforesaid two easy axes of the crystal of the YIG type aligns, are 70.5 degrees apart. When the second magnetic field producing assembly 32 is in the retracted position shown in FIG. 1, no current is passed through Helmholtz coils 48 and 49. Under the influence of the magnetic field produced by coils 46 and 47 of field producing assembly 31, the crystal body 17 rotates in the cup-shaped indentation at the end of rod 22, until an easy axis thereof is aligned with the flux lines of the magnetic field produced by coils 46 and 47.

The first magnetic field producing assembly 31 now is moved up to the retracted position along the rods 44 of support assembly 25 and the current source is disconnected from leads 56 to 59. The second magnetic field producing assembly 32 now is moved until the sleeves 50 thereof extend over the rods 44 of both support assemblies 27 and 28. The second magnetic field producing assembly 32 now is in a position such that the crystal body 17 is midway between coils 48 and 49 and along the axis of these coils. Current then is supplied to leads 61 to 64 and a uniform magnetic field is produced in the region of the crystal body 17 in a direction relative to the axis of rod 22 indicated by the calibration mark lying under the index plates 45 of support assemblies 27 and 28. The crystal body 17 then rotates until another easy axis is aligned with the magnetic field flux produced by the coils 48 and 49. The above process of energizing first one set of Helmholtz coils and then the other is repeated, say six to eight times, to insure parallelism between the crystal plane containing the two easy axes and the plane constituted by the mounting ring 11.

Both magnetic field producing assemblies 31 and 32 then are retracted and a pick-up assembly 66 is brought into use. The pick-up assembly 66, shown in FIGS. 1 and 3, includes a composite slidable member 67 similar to the slidable member 35 described in connection with the adjustable support assemblies 25 to 28. The angular position of the pick-up assembly 66 is adjustable by sliding the member 67 along the circular ring 11 to a point midway between the two slidable members 35 of respective support assemblies 25 and 27 if an axis, such as an intermediate axis, related to the easy axes of crystal body 17 is to be located. The slidable member 67 likewise has a transparent index plate 45 carrying a cross-hair visible through the aperture in the front face plate and juxtaposed with a calibration marking which provides an indication of the position of the axis of the pick-up rod 70. From the slidable member 67 extends a pair of rods 72 which pass through apertures in a first plate 74 and are attached to a second plate 75. Set screws 76 are provided in plate 74 for clamping plate 74 to rods 72. During coarse adjustment of the pick-up rod 70, the set screws 76 are loosened from the guide rods 72 and the plate 74 is moved, as by hand, until the free end of the pick-up rod 70 is very close to the crystal body 17. As the plate 74 is moved, the fine adjustment subassembly moves as a unit. This fine adjustment subassembly includes the guide elements 78, a disc 80 to which the elements 78 are attached, an apertured disc 81 (visible in FIG. 1) through which guide elements 78 pass, and an adjustment screw 84. A rod 82, which is threaded at one end, extends through an aperture in plate 75 and the apertures in disc 81. A sleeve 86 has one end mounted to the free end of rod 82 by a set screw 87 and contains a second set screw 88 near the other end for securing the pick-up rod 70.

Fine adjustment of the pick-up rod 70 is accomplished when the set screws 76 in plate 74 are tightened against the rods 72 of the fine adjustment subassembly. The adjustment screw 84 is rotated in the proper direction, causing the rod 82 to move either downwardly or upwardly, depending upon the direction of rotation of the adjustment screw 84. The combination of disc 81 and rods 72 serves to prevent rotation of the rod 82 during rotation of adjustment screw 84. When the pick-up rod 70 has been brought almost in contact with crystal body 17, bonding material may be applied to the rod 70 or the crystal body 17, or both. This bonding material should be a dimensionally stable material, such as Canada balsam, so that the relative position of pick-up rod 70 and crystal body 17 is not changed during drying or setting of the bonding material. When the position of the pick-up assembly has been finally adjusted so that the pick-up rod 70 is in contact with the crystal body 17, sufficient time is allowed for bonding, the movable portion of pick-up assembly 66 is retracted, the set screw 88 is loosened and the crystal-rod assembly 17, 70 is removed from sleeve 86. The crystal body 17 will now be oriented with an intermediate axis coinciding with the axis of the pick-up rod 70.

It is possible to orient the pick-up rod 70 with respect to the hard axis of the crystal body 17 by moving the adjustable support assemblies to positions 109.5/2 degrees equal 54.75 degrees removed from the zero position along ring 11. The support assemblies are moved, in this case, so that the hairline on index plate 45 coincides with the correct calibration marks 12'. After a procedure as described previously, the axis of the pick-up rod 70 then will coincide with the hard axis of the crystal body 17.

This method can analogously be used to orient spherical crystals of a ferroelectric nature by replacing the magnetic fields by electric fields.

What is claimed is:

1. A method for locating crystallographic axes in a single spherical crystal ferromagnetic body having first and second axes angularly displaced by an angle α and having a related axis angularly displaced from said first and second axes by a known angle comprising the steps of mounting said body to rotate freely and universally about its center, and alternately subjecting said body to one of a pair of uniform magnetic fields the directions of which are adjustable and mutually displaced by said angle α, said body rotating until each of said first and second axes is in alignment with a corresponding one of said magnetic fields.

2. A method for locating crystallographic axes in a single crystal ferromagnetic body as recited in claim 1 further including the step of positioning the longitudinal axis of a pick-up rod to coincide with said related axis.

3. A method for locating crystallographic axes in a single crystal ferromagnetic body mounted to rotate freely at the center of a circular calibrated frame upon a pedestal having an axis passing through said center comprising removing a first magnetic field producing means from the region of said body, introducing a second magnetic field producing means in the vicinity of said body, positioning said second magnetic field producing means along said frame until the longitudinal axis of said second magnetic field producing means is angularly displaced from the axis of said pedestal by half the angle between two adjacent easy axes of said body, exposing said body to a second magnetic field from said second magnetic field producing means whereupon one easy axis of said body aligns itself with the direction of said second magnetic field, removing said second magnetic field producing means from the vicinity of said body, introducing said first magnetic field producing means in the vicinity of said body, positioning said first magnetic field producing means along said frame until the angular displacement between the longitudinal axes of said first and second magnetic field producing means is equal to the angular displacement of said two easy axes, exposing said body to a first uniform magnetic field from said first said magnetic field producing means whereupon said body aligns itself with a second easy axis adjacent said first easy axis, and repeating the aforesaid steps in the order named at least once.

4. A method for locating crystallographic axes in a single crystal ferromagnetic body as recited in claim 3 further including the steps of positioning the longitudinal axis of an elongated rod mounted from a supporting structure in line with said pedestal axis, adjusting the position of said rod until it contacts said body and bonding said rod to said body.

5. An apparatus for locating crystallographic axes in a single crystal ferromagnetic body having a pair of easy axes angularly displaced by an angle α and having a related axis displaced from each of said easy axes by an angle α/2 comprising a calibrated circular mounting ring, first and second uniform magnetic field producing assemblies mounted to move separately along said ring for producing first and second magnetic fields the directions of which are angularly displaced from one another by said angle α, and holding means mounted on said ring and including an elongated holder for mounting said crystal body at the center of said ring so that it is free to rotate in any direction, said assemblies each including coil means being movable radially for repetitively exposing said crystal body to one of said magnetic fields to the exclusion of the other magnetic field, said crystal body rotating so that easy axes become aligned with the direction of the corresponding magnetic fields.

6. An apparatus for locating crystallographic axes in a single crystal ferromagnetic body as recited in claim 5 and further including mounting means having an elongated pick-up rod and a portion movable along said ring, the longitudinal axis of said rod being adjustable to coincide with the bisector of the angle α, and means for positioning said rod until contact is made with said crystal body.

7. An apparatus for locating crystallographic axis in single crystal ferromagnetic bodies having first and second easy axes and a related axis angularly displaced from said easy axes by a predetermined amount comprising a calibrated circular mounting ring, first and second support structures mounted to move separately along said ring to portions wherein the axes of said support structures are angularly spaced from one another by the angle between adjacent easy axes, said first and second support structures carrying first and second uniform magnetic field producing means respectively, holding means having a portion mounted on said ring and having an elongated member for holding said crystal body at the center of said ring so that it is free to rotate in any direction, said support structures including means for separately introducing said respective magnetic field producing means in the region of said crystal body while the other of said magnetic field producing means is retracted, and means for separately energizing said first and second magnetic field producing means to produce magnetic fields which are directed along the axes of the respective first and second support structures, said crystal body rotating so that an easy axis thereof is in alignment with the direction of the particular magnetic field to which said crystal body is subjected.

8. An apparatus for locating crystallographic axis in single crystal ferromagnetic bodies having first and second easy axes and a related axis angularly displaced from said easy axes by a predetermined amount comprising a calibrated circular mounting ring, first and second support structures mounted to move separately along said ring to portions wherein the axes of said support structures are angularly spaced from one another by the angle between adjacent easy axes, said first and second support structures carrying first and second uniform magnetic field producing means respectively, holding means having a portion mounted on said ring and having an elongated member for holding said crystal body at the center of said ring so that it is free to rotate in any direction, said support structures including means for separately introducing said respective magnetic field producing means in the region of said crystal body while the other of said magnetic field producing means is retracted, means for separately energizing said first and second magnetic field producing means to produce magnetic fields which are directed along the axes of the respective first and second support structures, said crystal body rotating so that each of said first and second easy axes thereof is in alignment with the direction of the respective first and second magnetic fields to which said crystal body is subjected, and mounting means having a portion movable along said ring and carrying an elongated mounting rod, the longitudinal axis of said mounting rod being movable to a position angularly displaced from said easy axes by said predetermined amount, said mounting means including means for moving said elongated member into contact with said crystal body whereupon said member may be bonded to said body.

References Cited

UNITED STATES PATENTS

| | | | |
|---|---|---|---|
| 1,599,645 | 9/1926 | Burrows | 324—14 XR |
| 2,046,717 | 7/1936 | Bitter | 324—14 XR |
| 2,173,552 | 9/1939 | Franklin | 324—56 |
| 2,260,562 | 10/1941 | Dillon | 324—14 XR |
| 3,183,434 | 5/1965 | Auer | 324—14 |
| 3,337,797 | 8/1967 | Matay | 324—14 XR |

FOREIGN PATENTS 254,307    9/1927    Great Britain.

RUDOLPH V. ROLINEC, *Primary Examiner.*

G. R. STRECKER, *Assistant Examiner.*